(12) United States Patent
Choudhary et al.

(10) Patent No.: US 11,349,793 B2
(45) Date of Patent: May 31, 2022

(54) ENFORCING MESSAGING POLICIES USING TAGS

(71) Applicant: Meta Platforms, Inc., Menlo Park, CA (US)

(72) Inventors: Salahuddin Choudhary, Palo Alto, CA (US); Yi Xiao, Sunnyvale, CA (US); Mikhail Larionov, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 494 days.

(21) Appl. No.: 15/793,893

(22) Filed: Oct. 25, 2017

(65) Prior Publication Data

US 2019/0124025 A1 Apr. 25, 2019

(51) Int. Cl.
| | |
|---|---|
| *G06F 15/16* | (2006.01) |
| *H04L 51/00* | (2022.01) |
| *H04L 51/52* | (2022.01) |
| *H04L 51/02* | (2022.01) |
| *G06F 40/279* | (2020.01) |

(52) U.S. Cl.
CPC ............ *H04L 51/12* (2013.01); *G06F 40/279* (2020.01); *H04L 51/02* (2013.01); *H04L 51/32* (2013.01)

(58) Field of Classification Search
CPC .................................. H04L 51/12; H04L 51/00
See application file for complete search history.

(56) References Cited

U.S. PATENT DOCUMENTS

| | | | | |
|---|---|---|---|---|
| 7,222,158 B2 * | 5/2007 | Wexelblat | .............. | G06Q 30/06 709/206 |
| 8,166,161 B1 * | 4/2012 | Gannu | ................ | H04L 63/0245 709/206 |
| 2007/0117552 A1 * | 5/2007 | Gobburu | ................. | H04W 4/10 455/414.1 |
| 2014/0337413 A1 * | 11/2014 | Kamma | .................. | H04L 67/06 709/203 |

* cited by examiner

*Primary Examiner* — Hua Fan
(74) *Attorney, Agent, or Firm* — Fenwick & West LLP

(57) ABSTRACT

A messaging system receives a message sent by an enterprise to an individual user. The message has an associated message tag describing the content of the message. The messaging system applies a filtering policy to the message. The filtering policy selectively blocks messages sent by enterprises to users. The filtering policy allows the message having the associated tag to pass through the filter even though the message might otherwise violate the filtering policy. The messaging system samples a subset of tagged messages from enterprises and analyzes the messages for compliance with a tagging policy. The messaging system may also train one or more tag models to recognize the correct tags for the messages.

17 Claims, 5 Drawing Sheets

ENFORCING MESSAGING POLICIES USING TAGS

BACKGROUND

This disclosure relates generally to electronic messaging, and more particularly to filtering messages communicated between senders and recipients in electronic messaging systems.

Use of dedicated messaging applications for commercial transactions is becoming more commonplace. For example, a customer of an online business might purchase a product and request that the business provide a receipt via the messaging application. Businesses, in addition, may wish to use such applications to communicate directly with their customers and potential customers.

Dedicated messaging applications provide a rich feature set that may not be available using conventional email or other messaging technologies. Both the sender and receiver of the messages can be authenticated and delivery of the messages can be verified. In addition, the messages can include certain formatting and/or content features that are not supported by other messaging technologies.

A downside to such messaging systems is potential for abuse. A business participating in the messaging system might be inclined to frequently message potential customers. Such messages could be considered unwanted by the recipients and thereby have a negative impact on the usefulness, or perceived usefulness, of the messaging system.

SUMMARY

The above and other issues are addressed by a messaging system that determines actions to perform on sent messages based on tags associated with the messages. The messaging system allows enterprises to communicate with individual users. An enterprise can associate message tags with sent messages. A message tag describes the content of a message. For example, the message tag can indicate that the message contains content that the recipient desires to receive, such as content about a shipping update, reservation update, or issue resolution.

The messaging system applies one or more filtering policies to messages sent by enterprises based at least in part on the associated tags. A filtering policy may selectively block messages sent by an enterprise to a user. The policy prevents the enterprise from sending unwanted messages to the user, such as commercial solicitations. The messaging system evaluates any tag associated with a message when applying the filtering policy. The filtering policy may allow a message having a tag to pass through the filter even though the message might otherwise violate the filtering policy.

The messaging system samples a representative subset of tagged messages. The messaging system analyzes the sampled messages for compliance with a tagging policy. A message complies with the policy if the content of the message matches the tag associated with the message. The messaging system generates compliance scores indicating the degree to which messages from enterprises comply with the tagging policy. The compliance scores may be used in connection with the filtering policy.

The messaging system may also analyze tagged messages to train one or more tag models to recognize the correct tags for the messages. Supervised learning can be used to train the tag models. The tag models can be used to determine whether a given message is correctly tagged and to determine the correct tag to apply to an untagged message.

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

Architecture of a System for Enforcing Messaging Policies Using Tags

Figure 1:
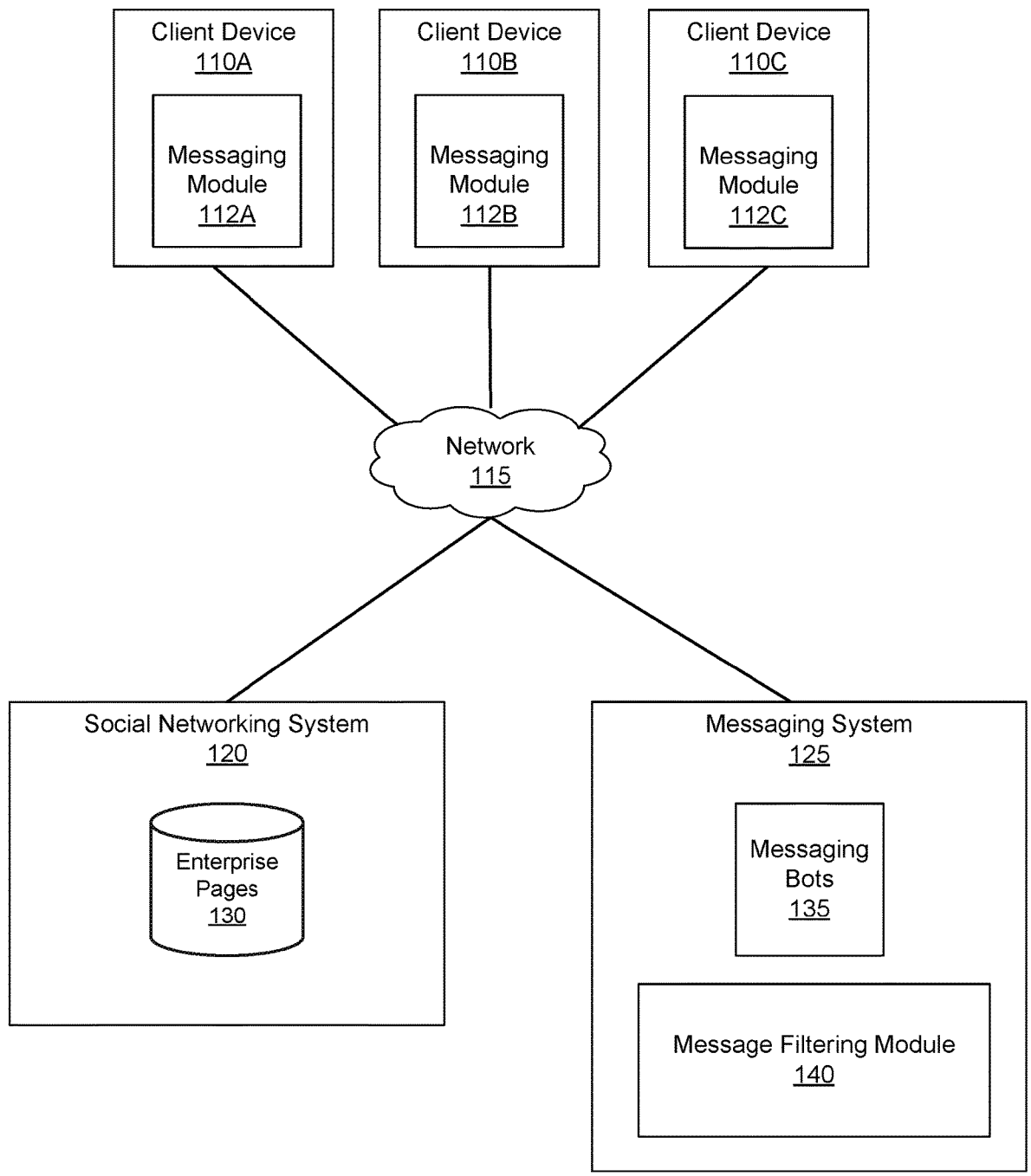
FIG. 1 is a high-level block diagram illustrating a system environment including an electronic messaging system.

FIG. 1 is a high-level block diagram illustrating a system environment 100 including an electronic messaging system 125. The environment 100 includes multiple client devices 110 connected to the electronic messaging system 125 via a network 115. A social networking system 120 is also connected to the network 115. While only a few client devices 110 and one messaging system 125 are shown in FIG. 1, embodiments of the environment 100 can have many such entities connected to the network 115. Other components may also be connected to the network 115.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client device 110 is a computing device that can transmit and/or receive data via the network 115. A user may use the client 110 device to perform functions such as exchanging messages using the messaging system 125, interacting with the social networking system 120, browsing websites on web servers on the network 115, consuming digital content received via the network, and executing software applications. For example, the client device 110 may be a smartphone or a tablet, notebook, or desktop computer. In addition, the client device 110 may be an Internet-of-Things (IoT)-connected device such as a home appliance. The client device 110 may include a display device on which the user may view digital content, such as messages received from the messaging system 125.

The client device 110 may execute one or more applications ("apps") that extend the functionality of the client device. The apps may include a web browser that allows the client device 110 to interact with websites provided by servers connected to the network 115. The apps may also include one or more dedicated apps for accessing the social networking system 120 and/or the messaging system 125. In one embodiment, the user downloads and installs apps on the client device 110 for specific purposes, such as exchanging messages using the messaging system 125. Alternatively, the functionality of an app may be incorporated into an operating system of the client device 110 or included in other native functionality of the client device 110.

The messaging module 112 illustrated within the client device 110 in FIG. 1 represents an app for interacting with the messaging system 125 via the network 115. The messaging module 112 enables a user of the client device 110 to exchange messages with other client device users and with other entities. The messaging module 112 may also allow the user to perform other actions related to messages, such as providing feedback to the messaging system 125 regarding received messages.

The user of a client device 110 may send messages on behalf of an individual (e.g., on behalf of the user) or an enterprise (e.g., a business). In the individual scenario, messages that a user exchanges using a client device 110 are uniquely associated with the user and/or the client device. Such messages may reference the user that exchanged the messages by name or via another identifier, such as a telephone number. In the enterprise scenario, multiple users can use multiple different client devices 110 to send messages associated with the enterprise. Messages exchanged by a user on behalf of an enterprise may reference the enterprise by name and/or other identifier, rather than referencing the actual user or device 110 that exchanged the message. Hence, different users using different client devices 110 can exchange messages on behalf of a particular enterprise.

The social networking system 120 supports interactions among users of the client devices 110. These interactions may include exchanging and viewing content, ecommerce transactions, and messaging. The content provided by the social networking system 120 includes enterprise pages 130 associated with enterprises. The enterprises may include the enterprises with which certain users of the client devices 110 are associated. A page provides information about an enterprise and may support other interactions such as allowing users to share information with the enterprise.

In one embodiment, an enterprise page 130 includes a communication link with which a user can interact to initiate a message exchange with the associated enterprise via the messaging system 125. The functionality may take the form of a code such as a clickable object or scannable image that contains a reference to the enterprise's presence in the messaging system 125. When a user interacts with the communication link, the social networking system 120 interacts with the messaging module 112 of the user's client device to exchange messaging information, such as identifiers of the user and enterprise, allowing the user and enterprise to exchange messages using the messaging system.

In a further embodiment, the communication link may be located on the network 115 at a location outside of the social networking system 120. For example, the enterprise may place the communication link on a website hosted by a web server connected to the network 115. In this example, a user of a client device 110 can browse the website and interact with the communication link to exchange messages without having visited the social networking system 120.

A user may interact with the communication link to exchange messages with the enterprise for a variety of reasons. For example, the user may seek to resolve an issue involving the enterprise. The user may also engage in an ecommerce transaction with the enterprise and seek to receive a receipt for the transaction via the messaging system 125. Additionally, the user may request to receive shipping notifications, reservation updates, or other information associated with transactions between the user and the enterprise.

The messaging system 125 interacts with the messaging modules 112 of the client devices 110 to support the exchange of electronic messages among the users of the devices. As mentioned above, some users of the client devices 110 send messages on behalf of enterprises, while other users send messages as individuals. Some of the messages exchanged by the messaging system are therefore sent between individuals and enterprises. The messages may be encrypted, in which case the messaging system 125 may not have access to the content of the messages.

Further, the messaging system 125 includes messaging bots 135 that can also send messages on behalf of enterprises. In one embodiment, a messaging bot 135 is a software module (i.e., a program) that sends automated messages on behalf of an enterprise. A messaging bot is typically activated in response to a user of a client device 110 sending a message to the enterprise. For example, a user may use the communication link to send a message containing a question to the enterprise. The messaging bot 135 associated with the enterprise receives and processes the message. For example, the messaging bot 135 may programmatically generate and send a response to the message based on the content of the message and/or the state of the recipient's dealings with the enterprise (e.g., whether the recipient has purchased a product from the enterprise). The messaging bot 135 may also forward the message to an individual associated with the enterprise for further consideration.

A messaging bot 135, user, or other entity sending a message on behalf of an enterprise may add a tag to the message. The tag ostensibly describes the content of the message. For example, a tag may indicate that a message pertains to issue resolution, shipping notifications, reservation updates, and the like. The enterprise may follow a tagging policy provided by the messaging system 125 that specifies the types of messages that may be tagged using particular tags.

A message filtering module 140 within the messaging system 125 filters messages sent from enterprises to users of client devices 110 according to one or more filtering policies. The filtered messages may include those generated automatically by messaging bots 135 and messages generated manually by users acting on behalf of the enterprise. Generally, the message filtering module 140 applies a filtering policy that selectively blocks messages sent by the enterprises to the users. The filtering policy prevents enterprises from sending unwanted messages to the users, such as commercial solicitations. The message filtering module 140 thus improves the users' experiences with the messaging system 125 by preventing enterprises from abusing the messaging system by sending certain types of messages to users.

The filtering policy passes (i.e., does not block) other types of messages that users likely desire to receive. In one embodiment, the message filtering module 140 evaluates any tags associated with the messages when applying the filtering policy. The filtering policy may allow messages with certain tags to pass through the filter even though such messages might otherwise violate a filtering policy. The use of tags therefore allows the message filtering module 140 to filter unwanted and/or unsolicited messages and still pass desired messages, even when messages are encrypted and the message content cannot be accessed by the messaging system 125.

In one embodiment, the network 115 uses standard communications technologies and/or protocols. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2:
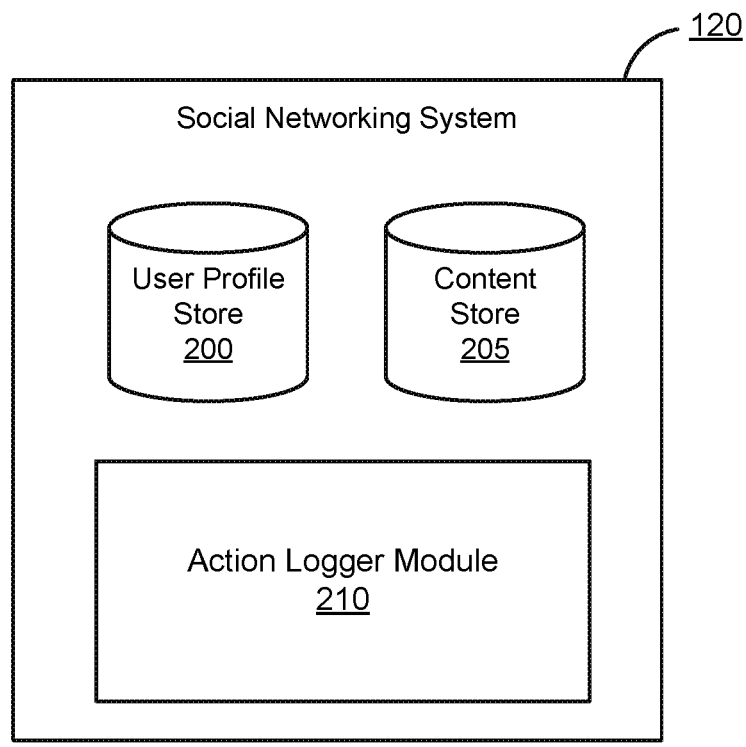
FIG. 2 is a block diagram of an architecture of the social networking system according to one embodiment.

FIG. 2 is a block diagram of an architecture of the social networking system 120 according to one embodiment. The social networking system 120 shown in FIG. 2 includes a user profile store 200, a content store 205, and an action logger module 210. In other embodiments, the social networking system 120 may include additional, fewer, or different components for various applications. Conventional components such as network interfaces, security functions, load balancers, failover servers, management and network operations consoles, and the like are not shown so as to not obscure the details of the system architecture.

Each user of the social networking system 120 is associated with a user profile, which is stored in the user profile store 200. A user profile includes declarative information about the user that was explicitly shared by the user and may also include profile information inferred by the social networking system 120. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action logger module 210.

The content store 205 stores objects that each represent various types of content. Examples of content represented by an object include a page post, a status update, a photograph, a video, a link, a shared content item, a gaming application achievement, a check-in event at a local business, or any other type of content. In one embodiment, the enterprise pages 130 illustrated in FIG. 1 are stored within the content store 205 of FIG. 2.

Social networking system users may create objects stored by the content store 205, such as status updates, photos tagged by users to be associated with other objects in the social networking system 120, events, groups or applications. In some embodiments, objects are received from third-party applications separate from the social networking system 120. In one embodiment, objects in the content store 205 represent single pieces of content, or content "items." Hence, social networking system users are encouraged to communicate with each other by posting text and content items of various types of media to social networking system 120 through various communication channels. This increases the amount of interaction of users with each other and increases the frequency with which users interact within the social networking system 120.

The action logger module 210 receives communications about user actions internal to and/or external to the social networking system 120, populating an action log with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log.

Figure 3:
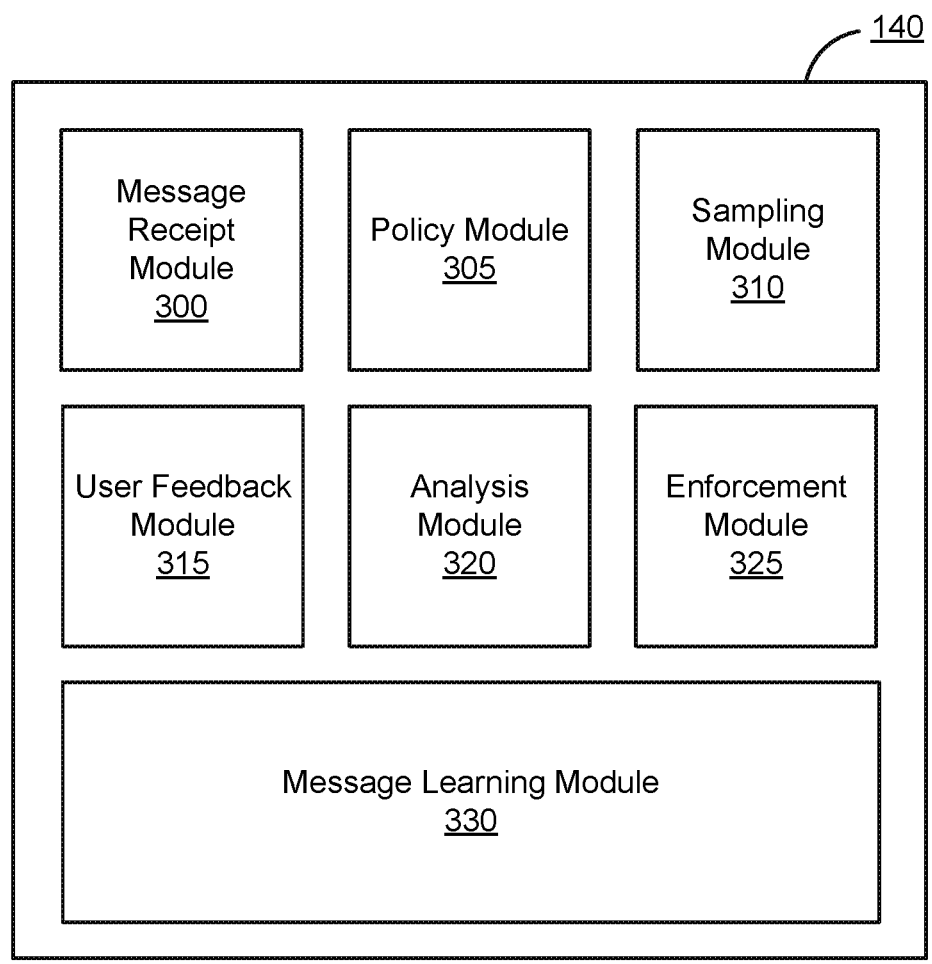
FIG. 3 is a block diagram illustrating a more detailed view of the message filtering module according to one embodiment.

FIG. 3 is a block diagram illustrating a more detailed view of the message filtering module 140 (subsequently referred to as the "filtering module") according to one embodiment. The filtering module 140 shown in FIG. 3 includes a message receipt module 300, a policy module 305, a sampling module 310, a user feedback module 315, an analysis module 320, an enforcement module 325, and a message learning module 330. In other embodiments, the filtering module 140 may include additional, fewer, or different modules. In addition, the functionality attributed to specific modules herein may be performed by other modules in other embodiments.

The message receipt module 300 receives messages to be filtered. In one embodiment, the messages are received from enterprises and addressed to recipients who are users of the client devices 110. The messages may originate from client device users who are operating on behalf of enterprises and from messaging bots 135. In one embodiment, a message includes a header and a body. The header includes information about the message, such unique identifiers of the message, sender (e.g., an identifier of the enterprise page and/or bot that generated the message), recipient, and thread between the sender and recipient. The header also includes any tags associated with the message. The tag is represented as a value, such as a bit string or character string.

The body of a message contains the content for the message. The content may include images, text, and links. In one embodiment, the body of a message may contain content arranged into one or more templates. A message template is a specific arrangement of content. The arrangement may be generic or designed for a specific purpose and/or to convey a specific type of information. In one embodiment, a message template has a set of fields in a particular arrangement, and the sender of the message populates the fields with content specific to the message. The message body may be encrypted so that only the message sender and recipient can view the content. Hence the filtering module 140 cannot access the message content.

The policy module 305 applies one or more filtering policies to messages received by the message receipt module 300. Generally, a filtering policy restricts messages that can be sent by enterprises to client device users to prevent abuse. Upon receipt of a message, the policy module 305 examines the message header to identify any tag contained therein. The policy module 305 also identifies one or more filtering policies applicable to the message, and applies an identified policy to the message. In one embodiment, the policy either blocks or passes the message.

A thread-based filtering policy used by the policy module 305 prohibits enterprises from initiating message threads with recipients. Accordingly, the policy module 305 applies this policy to block a message from an enterprise to a recipient if the recipient has not previously sent a message to the enterprise. A time-based filtering policy enforces restrictions on the timing and number of messages enterprises can send to recipients. For example, the time-based policy may allow an enterprise to send an unlimited number of messages to a recipient within a 24-hour period measured from when the recipient last messaged the enterprise, followed by one additional message after the 24-hour period.

A tag-based filtering policy selectively passes message from enterprises to recipients if the messages includes specific tags. A message tag essentially grants an exception to other filtering policies, such as the thread- and/or time-based filtering polices, that would otherwise be applied to block the messages. In one embodiment, the tag-based policy grants an exception to time-based filtering policies. However, it does not grant an exception to the thread-based policy. Hence, the tag-based filtering policy will block a tagged message if the recipient has not previously messaged the enterprise, and will pass the tagged message if the recipient has previously messaged the enterprise, even if the message violates the time-based policy.

As mentioned above, a message tag describes the content of the associated message. There are multiple different types of message tags. In one embodiment, the tags include a SHIPPING_UPDATE tag which is used to provide a shipping status notification for a product purchased by the message recipient. This tag may be used, for example, with messages sent when the product is shipped, in-transit, delivered, or delayed. A RESERVATION_UPDATE tag is used to confirm updates to a reservation made by the recipient. This tag may be used, for example, with messages sent when a hotel booking is canceled, a car rental pick-up changes, or a room upgrade is confirmed. An ISSUE_RESOLUTION tag is used to respond to a customer service issue surfaced in a messaging system 125 conversation after a transaction has taken place. This tag may be used, for example, to send messages where the enterprise requires more than 24 hours to resolve an issue and needs to give the recipient a status update and/or gather additional information. Other embodiments can use different and/or additional tags.

The sampling module 310 selects a representative subset of tagged messages for analysis and/or other purposes. The sampling module 310 selects a small amount (e.g., 1-5%) of tagged messages sent by enterprises according to a sampling policy. The sampling policy specifies which messages to select and may use a variety of different criteria. The sampling criteria may include one or more of the following example criteria: the number of messages sent by the enterprise in the past (e.g., over a sliding window of time), the age of the enterprise within the messaging system 125, the size of the messages, the type of tags applied to the messages, and the enterprise's past rate of compliance with the tagging policy. For example, the sampling module 310 may sample a greater amount of messages from an enterprise that has been using the messaging system 125 for a relatively short time period than from an enterprise that has been using the messaging system 125 for relatively long time period. Likewise, the sampling module 310 may sample a greater amount of messages from an enterprise that has violated the tagging policy in the past than from an enterprise that has not violated the tagging policy. The enterprise's past rate of compliance may be represented by a compliance score.

A user feedback module 315 receives feedback about messages from client devices 110. As mentioned earlier, users of the client devices 110 can use the messaging modules 112 to provide feedback about received messages or other aspects of the messaging system 125. The user feedback module 315 collects feedback associated with particular messages. The collected feedback may include the user's sentiment with respect to given messages. For example, the feedback may include sentiment that a user provided by using "thumbs up" and "thumbs down" buttons to respectively indicate positive or negative sentiment toward a given message. The feedback may also indicate a reason that the user provided the feedback. For example, the feedback may indicate that it was sent because the content of a particular message did not match the tag applied to the message. The collected feedback may further include message content. For example, the feedback may include the content from a message to which the sentiment is directed.

The analysis module 320 analyses messages sent by enterprises for compliance with the messaging system's tagging policy. The analysis module 320 receives messages selected by the sampling module 310 and the feedback collected by the user feedback module 315 and uses some or all of this information to determine whether the selected messages are correctly tagged according to the tagging policy. Generally, a message is correctly tagged if the content of the message matches the tag associated with the message. A message is incorrectly tagged if the content of the message does not match the associated tag. For example, a message tagged with SHIPPING_UPDATE is correctly tagged if the message contains content updating shipping information. If a message is incorrectly tagged, the analysis module 320 may identify content within the message that caused it to be incorrectly tagged, and may also identify a correct tag for a message.

The analysis module 320 may analyze the messages using automated and/or manual processes. The automated analysis uses features associated with a message, such as features associated with the content and header of the message, with the enterprise, and/or with the feedback, to determine whether the message is correctly tagged. For example, the automated analysis may use one or more models trained using supervised learning to determine whether the features indicate that the message is correctly tagged. For manual analysis, a human reviewer associated with the messaging system 125 reviews the messages and/or other information to determine whether the messages are correctly tagged.

The analysis module 320 may maintain and update compliance scores for the enterprises based on the results of the analyses and any received feedback for messages sent by the enterprises. A compliance score for an enterprise is a value indicating the degree to which messages from that enterprise comply with the tagging policy. For example, the compliance score can be a value between zero and one, with a zero score indicating complete failure and a one score indicating complete compliance.

The compliance score may be used by the filtering module 140 to enforce and/or evaluate compliance with the tagging policy. For example, the tagging policy can state that an enterprise with a compliance score indicating a rate of compliance below a threshold is prohibited from using particular tags. The policy module 305 can block messages from enterprises having compliance scores below the threshold that use those tags. Other modules within the filtering module 140, such as the sampling module 310 and the enforcement module 325, may also use the compliance score.

The enforcement module 325 applies an enforcement policy to sampled messages based on the results of the analyses performed by the analysis module 320. The enforcement policy indicates actions the enforcement module 325 should perform on the sampled messages based on whether the messages comply with the tagging policy (i.e., are correctly or incorrectly tagged). The enforcement policy may be specified by an administrator of the messaging system 125. There may be multiple enforcement policies. For example, the enforcement module 325 may use different enforcement policies for different tags and/or enterprises. If there are multiple enforcement policies, the enforcement module 325 determines the applicable policy and then applies that policy. In addition, the enforcement policy may indicate actions to perform based on compliance scores.

In one embodiment, the enforcement policy delivers messages that are correctly tagged. Thus, if the analysis module 320 determines that a message is correctly tagged, the enforcement module 325 will cause the messaging system 125 to deliver the message to the recipient without modification. In contrast, the enforcement policy may perform one or more of a variety of actions to messages that are incorrectly tagged. This actions may include blocking the messages, modifying the messages before delivery (e.g., by deleting inappropriate content from the messages), and changing the tag associated with the messages before delivery. For example, if the analysis module 320 determines that a message was tagged as a shipping notification but contains promotional content in addition to shipping information, the enforcement module 325 may block the message or delete the promotional content and deliver the modified message.

The message learning module 330 analyzes tagged messages to train one or more tag models to recognize the correct tags for the messages. The tag models can be used by other modules within the filtering module 140. For example, the tag models can be used by the policy module 305 and/or analysis module 320 to determine whether a given message is correctly tagged. In addition, the tag models can be used to determine the correct tag to apply to an untagged message. For example, the tag models can be used to obviate the need for enterprises to tag the messages. Instead, the tag models can be used by the policy module 305 to classify (i.e., determine a tag applicable to) the messages and apply a filtering policy to the classified messages.

In one embodiment, the message learning module 330 uses supervised learning to train a tag model. The messaging learning module 330 uses the results of the analyses conducted by the analysis module 320 to build training sets containing examples of correctly and incorrectly tagged messages and associated information about the messages. The message learning module 330 uses the information to generate a set of features describing the messages. The features may relate to the contents of the messages and/or the sending of the messages. For example, features related to the sending of the messages may include the business types of the enterprises, number and/or timing of the messages sent by particular enterprises, number of messages sent in a thread, time elapsed between messages, and times of day when messages were sent. This information is useful because certain types of messages, such as delivery notifications, are likely to follow similar patterns as items are delivered to recipients.

The message learning module 330 trains the tag models using the training sets. In one embodiment, the message learning module 330 trains a separate model for each tag, using separate training sets of messages tagged with the respective tags. The training sets may include sets with positive and negative examples. Different machine-learned models, such as models using linear support vector machine (linear SVM), boosting for other algorithms (e.g., Ada-Boost), neural networks, logistic regression, naïve Bayes, memory-based learning, random forests, bagged trees, decision trees, boosted trees, or boosted stumps—may be used in different embodiments. Once trained, a given tag model receives a message and outputs a value indicating a probability that the message conforms with the requirements of the tag (e.g., that a message is a shipping notification). The message learning module 330 can also use the training sets to train tag models to recognize content that is not acceptable for inclusion in a message having a given tag.

Method of Enforcing Messaging Policies Using Tags

Figure 4:
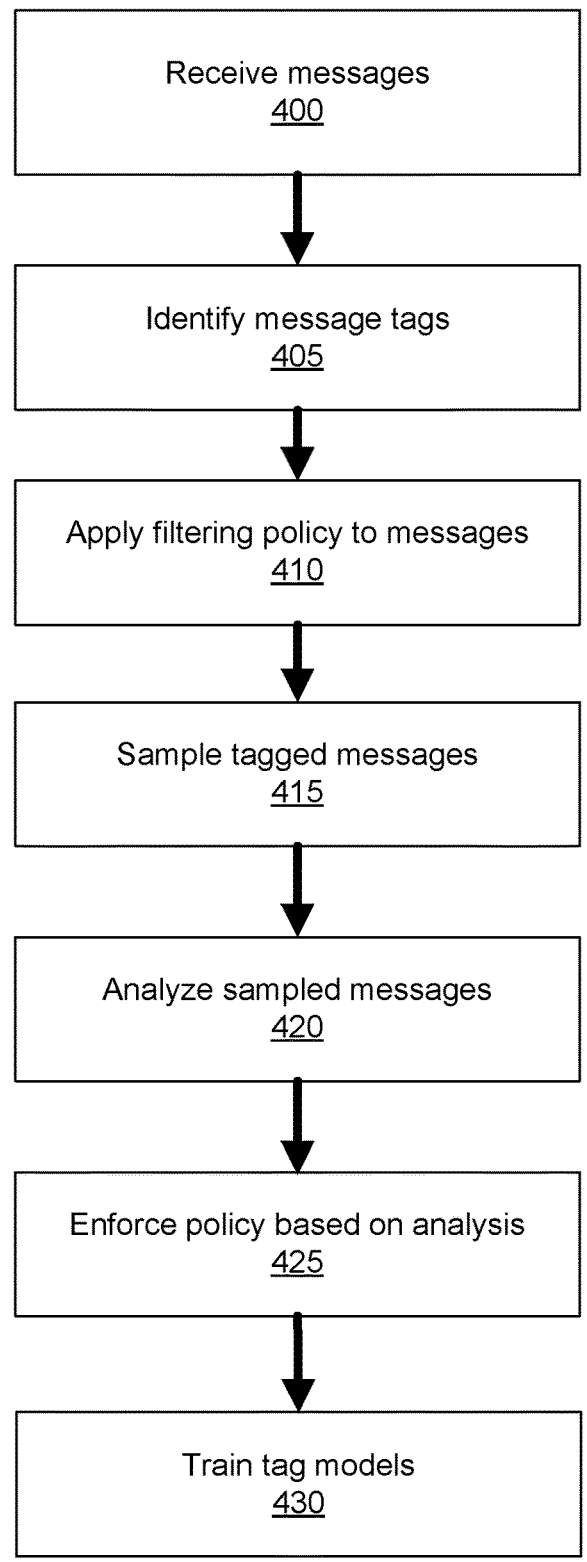
FIG. 4 is a flow chart illustrating a method of enforcing messaging policies using tags according to one embodiment.

FIG. 4 is a flow chart illustrating a method of enforcing messaging policies using tags according to one embodiment. The steps of FIG. 4 may be performed by the filtering module 140 as described below. Some or all of the steps may be performed by other modules in other embodiments. In addition, other embodiments may include different and/or additional steps and the steps may be performed in different orders.

The filtering module 140 receives 400 messages to be filtered. The messages may originate, for example, from messaging bots 135 of enterprises. The filtering module 140 identifies 405 the message tags associated with the messages. The tags ostensibly describe the content of the messages. The filtering module 140 then applies 410 one or more filtering policies to the messages based on the tags. The filtering policy specifies an action to take on the message based on the tag, such as selectively blocking messages sent by enterprises. A filtering module 140 allows messages with certain tags to pass through the filter even though such messages might otherwise violate the filtering policy.

In one embodiment, the filtering module 140 samples 415 the tagged messages according to a sampling policy. The filtering module 140 analyses 420 the sampled messages for compliance with a tagging policy. This analysis determines whether the messages are correctly tagged. The filtering module 140 then enforces 425 a compliance policy on the messages based on the results of the analysis. The compliance policy may delivery messages that are correctly tagged and block or modify messages that are incorrectly tagged. In addition, the filtering module 140 may train 430 one or more tag models to recognize the correct tags for messages. The tag models can be used by the filtering module 140 to apply the filtering policy, analyze sampled messages, and for other purposes.

Example Computer System

Figure 5:
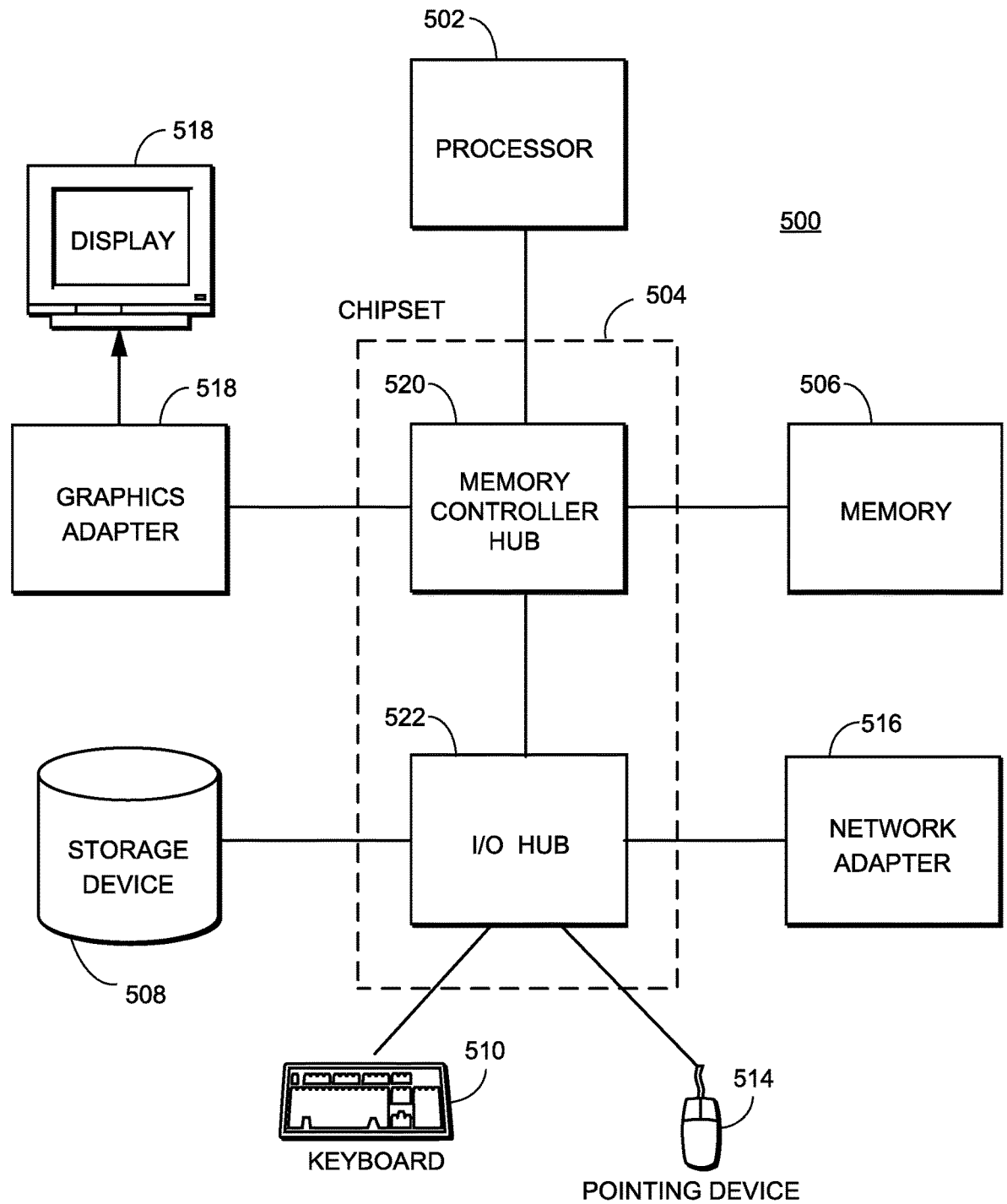
FIG. 5 is a high-level block diagram illustrating physical components of a computer used as part or all of one or more of the entities described herein in one embodiment.

FIG. 5 is a high-level block diagram illustrating physical components of a computer 500 used as part or all of one or more of the entities described herein in one embodiment. For example, instances of the illustrated computer 500 may be used as a server operating the messaging system 125. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O hub 522. In another embodiment, the memory 506 is coupled directly to the processor 502 instead of the chipset 504. In one embodiment, one or more sound devices (e.g., a loudspeaker, audio driver, etc.) is coupled to chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer system 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a message sent by a sender to a recipient using an electronic messaging system;
identifying a tag associated with the message, the tag describing content in a body of the message;
analyzing the message using a trained tag model, the trained tag model operative to receive the message and determine, based at least in part on one or more features associated with the message, whether the content of the message conforms with requirements associated with the tag;
applying a tag-based filtering policy, the tag-based filtering policy indicating an action for the messaging system to perform on the message based on the tag and a result of the analysis; and
performing the action indicated by the filtering policy on the message.

2. The method of claim 1, wherein identifying the tag associated with the message comprises:
identifying the tag in a header of the message.

3. The method of claim 1, wherein applying the tag-based filtering policy to the message comprises:
identifying a first filtering policy applicable to the message, the first filtering policy blocking the message from being sent from the sender to the recipient; and
identifying, responsive to the tag associated with the message, a second filtering policy applicable to the message, the second filtering policy granting an exception to the first filtering policy for the message and allowing the message to be sent from the sender to the recipient;
wherein performing the action indicated by the tag-based filtering policy comprises passing the message from the sender to the recipient according to the second filtering policy.

4. The method of claim 1, wherein a plurality of messages having the tag are sent by the sender and further comprising:
sampling a subset of the messages sent by the sender that have the tag;
analyzing a message in the sampled subset of messages for compliance with a tagging policy specifying types of messages that may be tagged using the tag; and
performing an enforcement action on the message in the sampled subset responsive to the analysis.

5. The method of claim 4, wherein analyzing the message in the sampled subset of messages comprises:

determining whether content of the message in the sampled subset of messages matches content described by the tag associated with the message.

6. The method of claim 4, wherein performing the enforcement action comprises:
delivering the message in the sampled subset from the sender to a recipient of the sampled message responsive to the analysis indicating that the message in the sampled subset complies with the tagging policy; and
blocking the message in the sampled subset from being sent from the sender to the recipient of the sampled message responsive to the analysis indicating that the message in the sampled subset does not comply with the tagging policy.

7. A non-transitory computer-readable storage medium storing computer program instructions executable by a processor to perform operations comprising:
receiving a message sent by a sender to a recipient using an electronic messaging system;
identifying a tag associated with the message, the tag describing content in a body of the message;
analyzing the message using a trained tag model, the trained tag model operative to receive the message and determine, based at least in part on one or more features associated with the message, whether the content of the message conforms with requirements associated with the tag;
applying a tag-based filtering policy, the tag-based filtering policy indicating an action for the messaging system to perform on the message based on the tag and a result of the analysis; and
performing the action indicated by the filtering policy on the message.

8. The computer-readable storage medium of claim 7, wherein identifying the tag associated with the message comprises:
identifying the tag in a header of the message.

9. The computer-readable storage medium of claim 7, wherein applying the tag-based filtering policy to the message comprises:
identifying a first filtering policy applicable to the message, the first filtering policy blocking the message from being sent from the sender to the recipient; and
identifying, responsive to the tag associated with the message, a second filtering policy applicable to the message, the second filtering policy granting an exception to the first filtering policy for the message and allowing the message to be sent from the sender to the recipient;
wherein performing the action indicated by the tag-based filtering policy comprises passing the message from the sender to the recipient according to the second filtering policy.

10. The computer-readable storage medium of claim 7, wherein a plurality of messages having the tag are sent by the sender, the operations further comprising:
sampling a subset of the messages sent by the sender that have the tag;
analyzing a message in the sampled subset of messages for compliance with a tagging policy specifying types of messages that may be tagged using the tag; and
performing an enforcement action on the message in the sampled subset responsive to the analysis.

11. The computer-readable storage medium of claim 10, wherein analyzing the message in the sampled subset of messages comprises:
determining whether content of the message in the sampled subset of messages matches content described by the tag associated with the message.

12. The computer-readable storage medium of claim 10, wherein performing the enforcement action comprises:
delivering the message in the sampled subset from the sender to a recipient of the sampled message responsive to the analysis indicating that the message in the sampled subset complies with the tagging policy; and
blocking the message in the sampled subset from being sent from the sender to the recipient of the sampled message responsive to the analysis indicating that the message in the sampled subset does not comply with the tagging policy.

13. A system comprising:
a computer processor for executing computer program instructions; and
a non-transitory computer-readable storage medium storing computer program receiving a message sent by a sender to a recipient using an electronic messaging system;
identifying a tag associated with the message, the tag describing content in a body of the message;
analyzing the message using a trained tag model, the trained tag model operative to receive the message and determine, based at least in part on one or more features associated with the message, whether the content of the message conforms with requirements associated with the tag;
applying a tag-based filtering policy, the tag-based filtering policy indicating an action for the messaging system to perform on the message based on the tag and a result of the analysis; and
performing the action indicated by the filtering policy on the message.

14. The system of claim 13, wherein identifying the tag associated with the message comprises:
identifying the tag in a header of the message.

15. The system of claim 13, wherein applying the tag-based filtering policy to the message comprises:
identifying a first filtering policy applicable to the message, the first filtering policy blocking the message from being sent from the sender to the recipient; and
identifying, responsive to the tag associated with the message, a second filtering policy applicable to the message, the second filtering policy granting an exception to the first filtering policy for the message and allowing the message to be sent from the sender to the recipient;
wherein performing the action indicated by the tag-based filtering policy comprises passing the message from the sender to the recipient according to the second filtering policy.

16. The system of claim 13, wherein a plurality of messages having the tag are sent by the sender, the operations further comprising:
sampling a subset of the messages sent by the sender that have the tag;
analyzing a message in the sampled subset of messages for compliance with a tagging policy specifying types of messages that may be tagged using the tag; and
performing an enforcement action on the message in the sampled subset responsive to the analysis.

17. The system of claim 16, wherein performing the enforcement action comprises:
delivering the message in the sampled subset from the sender to a recipient of the sampled message responsive to the analysis indicating that the message in the sampled subset complies with the tagging policy; and blocking the message in the sampled subset from being sent from the sender to the recipient of the sampled message responsive to the analysis indicating that the message in the sampled subset does not comply with the tagging policy.

\* \* \* \* \*

UNITED STATES PATENT AND TRADEMARK OFFICE
CERTIFICATE OF CORRECTION

PATENT NO. : 11,349,793 B2
APPLICATION NO. : 15/793893
DATED : May 31, 2022
INVENTOR(S) : Choudhary et al.

It is certified that error appears in the above-identified patent and that said Letters Patent is hereby corrected as shown below:

In the Claims

In Column 13, Claim 8, Line 35, delete "The computer-readable" and insert -- The non-transitory computer-readable --, therefor.

In Column 13, Claim 9, Line 39, delete "The computer-readable" and insert -- The non-transitory computer-readable --, therefor.

In Column 13, Claim 10, Line 55, delete "The computer-readable" and insert -- The non-transitory computer-readable --, therefor.

In Column 13, Claim 11, Line 65, delete "The computer-readable" and insert -- The non-transitory computer-readable --, therefor.

In Column 14, Claim 12, Line 4, delete "The computer-readable" and insert -- The non-transitory computer-readable --, therefor.

Signed and Sealed this
Sixteenth Day of May, 2023

Katherine Kelly Vidal
*Director of the United States Patent and Trademark Office*